United States Patent [19]

Barabino

[11] 4,067,376

[45] Jan. 10, 1978

[54] TIRE PRESSURE WARNING SYSTEM

[75] Inventor: William A. Barabino, North Reading, Mass.

[73] Assignee: Safety Research & Engineering Corporation, North Reading, Mass.

[21] Appl. No.: 649,846

[22] Filed: Jan. 16, 1976

Related U.S. Application Data

[62] Division of Ser. No. 421,538, Dec. 4, 1973, Pat. No. 3,934,223.

[51] Int. Cl.² .................. B60C 23/04; B60C 23/12
[52] U.S. Cl. ........................... 152/418; 116/34 R; 116/114 PV
[58] Field of Search ............... 152/415, 418; 340/58; 137/223, 226; 116/34 R, 114 PV, DIG. 16

[56] References Cited

U.S. PATENT DOCUMENTS

| | | | |
|---|---|---|---|
| 2,939,504 | 6/1960 | Bedford | 152/418 |
| 3,511,294 | 5/1970 | Bepristis et al. | 152/418 |
| 3,738,308 | 6/1973 | Barabino | 116/34 R |
| 3,866,563 | 2/1975 | Bluem | 116/34 R |
| 3,905,412 | 9/1975 | Marocco | 152/418 X |
| 3,977,355 | 8/1976 | Lorenz et al. | 116/34 R |

Primary Examiner—Drayton E. Hoffman
Assistant Examiner—Fred A. Silverberg
Attorney, Agent, or Firm—Morse, Altman, Oates & Bello

[57] ABSTRACT

Excessively high or low tire pressure is detected automatically with a warning signal generated for the operator. A device is attached to each wheel and includes a spring-loaded piston mounted for reciprocation in a cylinder formed in the device. The cylinder is provided with a porting arrangement which opens only at certain pressure limits. When the ports are opened a sonic or ultrasonic signal is generated and detected by sensors located in proximity to each wheel. The signals detected by the sensors are processed and utilized to actuate a warning signal that provides a visual and/or audio output for the operator. Means are provided for discriminating between background noise and the generated signal as well as to discriminate as to the location of the affected tire. In a modification of the invention, a reserve chamber is integrated into the body of the wheel and is adapted to replenish automatically air lost from the tire.

1 Claim, 7 Drawing Figures

TIRE PRESSURE WARNING SYSTEM

CROSS-REFERENCE TO RELATED APPLICATION

This application is a division of U.S. application Ser. No. 421,538 filed Dec. 4, 1973 now U.S. Pat. No. 3,934,223.

BACKGROUND OF THE INVENTION

1. Field of the Invention

This invention relates generally to tire pressure warning systems and more particularly is directed towards a new and improved system for providing warning signals to the operator in the event of either high or low air pressure in a tire. This invention also relates to a system for automatic replenishment of air lost from a tire while the vehicle is in motion as a means for minimizing the effects of a blowout.

2. Description of the Prior Art

In U.S. Pat. Nos. 3,489,998, 3,659,264 and 3,738,308 there are disclosed tire pressure alarm systems for motor vehicles wherein a serious change in air pressure is detected by the operator. This is done in the first patent by the means of a device fitted to the wheel adapted to generate a sonic signal in the event of an abnormally low pressure. A microphone is located in proximity to the wheel and, in the event of a signal from the device, the operator is alerted by an alarm on the dashboard, for example. In the second patent, both high and low pressures are detected by means of a reed that is vibrated by an excessive change in pressure. Again, the sensing device is located in proximity to the wheels and is activated by sympathetic vibration with the reed on the tire. Finally, the last patent discloses a wheel-mounted device incorporating an air-operated whistle responsive to both high and low pressure with sensors located in proximity to the wheels and with sensors operatively connected to an operator signaling system.

The present invention has for one of its objects the improvement in systems of the foregoing type.

A more specific object is to provide a tire pressure warning system that is quickly and easily installed. Another object of this invention is to provided a tire pressure warning system capable of discriminating between tires and also a system that is substantially insensitive to spurious noises. A further object of this invention is to provide a tire pressure warning system with a memory capability in the event of a substantial change of tire pressure occurring while the operator is not in the vehicle. Still another object of this invention is to provide a tire pressure warning system incorporated with an automatic pressure replenishing system functional while the vehicle is in motion or at rest.

SUMMARY OF THE INVENTION

This invention features a tire pressure warning system comprising a pressure responsive device mountable on the stem or to the wheel of a pneumatic tire and adapted to emit a sonic or ultrasonic signal whenever the pressure within the tire exceeds a maximum or minimum range. Each device involves a spring-loaded piston mounted for reciprocation in a cylinder formed with ports at axially spaced locations. The movement of the piston in response to the change in tire pressure opens and closes the ports to deliver air to the signal producing portion of the device, typically a discharge aperture configured to produce a sharply tuned whistle. A sonic or ultrasonic detecting device is located in proximity to each wheel, typically mounted in fixed position within the wheel well of the chassis. Each pickup is connected through amplifying circuitry to an alarm unit in the vehicle and typically on the dashboard whereby the operator will be alerted whenever the device is actuated by reason of high or low air pressure in any tire.

In a modification of the invention, an automatic air pressure replenishing system is provided. In the modification, each wheel is formed with an integral annular chamber adapted to store a quantity of compressed air under high pressure. A pressure relief valve connects between the chamber and the pneumatic tire and is adapted to release air from the chamber into the tire whenever pressure within the tire drops below a predetermined limit. The modification includes a signal generating device which warns the driver of the change in tire pressure.

DETAILED DESCRIPTION OF THE PREFERRED EMBODIMENTS

Figure 1:
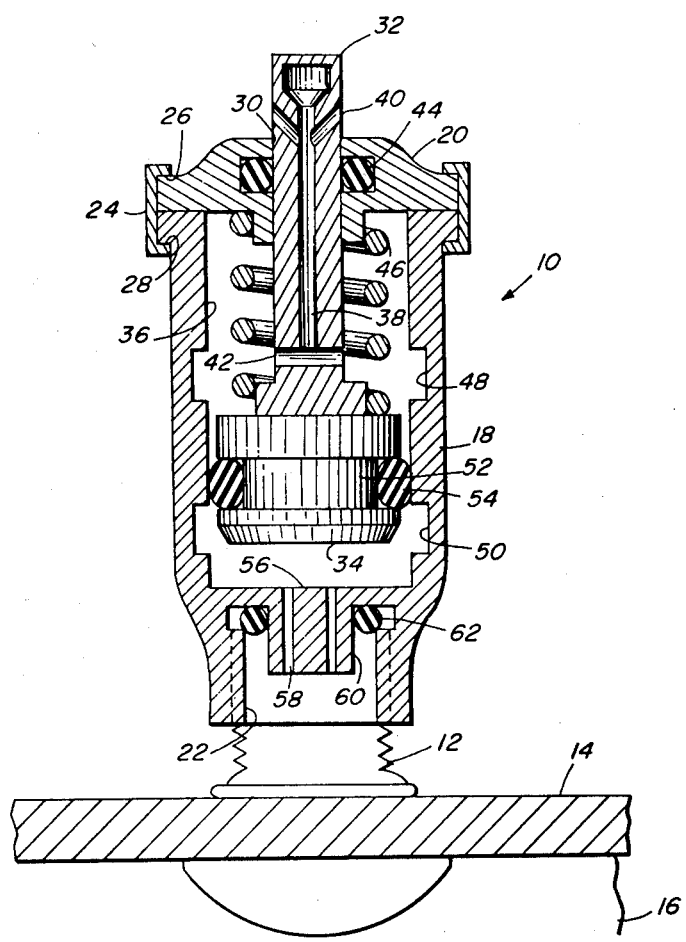
FIG. 1 is a sectional view in side elevation of a tire valve made according to the invention.
Figure 2:
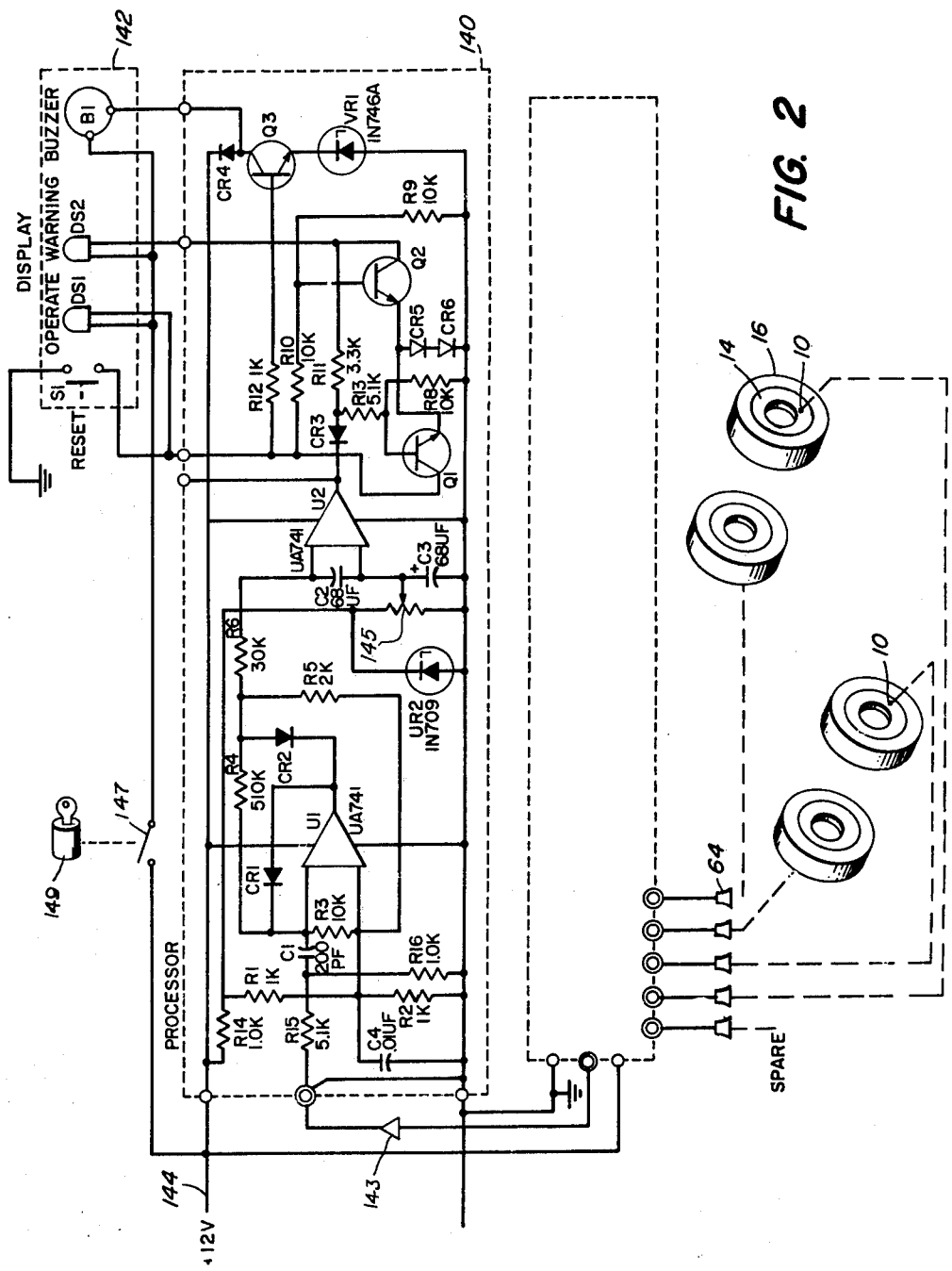
FIG. 2 is a schematic diagram of a tire pressure warning system made according to the invention.

Referring now to the drawings and to FIG. 1 in particular, the reference character 10 generally indicates a pressure responsive signalling device adapted to be screwed onto a standard valve stem 12 normally fitted to a wheel 14 on which a pneumatic tire 16 is mounted. The device 10 is comprised of a housing 18, typically of cylindrical construction, closed at its upper end by a cap 20 and at its lower end formed with a tapped socket 22 adapted to threadably engage the stem 12. The cap 20 is held to the top of the body 18 by means of an annulus 24 engaging cooperating shoulders 26 and 28 formed respectively on the cap 20 and on the upper end of the body 18.

The cap is formed with a central opening 30 through which extends a post 32 carried by a piston 34 mounted for reciprocation within a cylindrical chamber 36 in the body 18. The post 32 is formed with a central passage 38 terminating at its upper portion with diverging ports 40 which open to the atmosphere and at its lower portion terminating in a radial passage 42 communicating with the interior of the cylinder above the piston 34. The post passes through the opening 30 which is slidably sealed by an O-ring 44 mounted in an annular recess in the cap 20.

The piston 34 is normally urged downwardly by means of a compressed coil spring 46 trapped between the cap 20 and the top of the piston 34. The spring is selected to have sufficient force to maintain the piston 34 in a balanced position between a pair of axially spaced ports 48 and 50 normally located, respectively, above and below the piston 34. The piston 34, as shown in FIG. 1, is of a generally cylindrical configuration formed with an annular groove 52 in which is seated an O-ring 54 slidably and sealingly engaging the walls of the cylinder.

Accross the lower portion of the cylinder is formed a wall 56 having internal axial passages 58. The wall 56 forms into a downwardly extending neck 60 projecting into the tapped socket 22 and adapted to bear against the movable valve element in the stem 12 in order to open that valve when the device 10 is screwed into position. The upper portion of the socket 22 is provided with an O-ring 62 for sealing the valve stem to the device 10. With the device mounted in position, the same air pressure in the tire 16 will develop in the lower portion cylinder below the piston 34, forcing the piston into the balanced position. In the event that the pressure in the tire drops by reason of a leak or otherwise, the spring 46 will force the piston downwardly against the lowered air pressure, thereby moving the piston past the lower port 50, allowing a small amount of air to leak around the piston to the upper side of the cylinder from which it will flow through the port 42, up through the passage 38 and out of the ports 40.

The passageway 38 and ports 40 are configured to produce either a sonic or ultrasonic signal which will be detected by a sensor 64 mounted in close proximity to the wheel. Typically, the sensor is mounted in fixed position within a wheel well so that whenever a signal is generated by the device it will be picked up by the sensor. Likewise, if the pressure within the tire builds up excessively to exceed a predetermined limit, the piston 34 will be forced upwardly against the force of the spring 46 until it moves past the upper ports 48. In its upper position, a small amount of air again will leak around the piston and flow out through the passage 42, the passageway 38 and the ports 40, again generating a sonic or ultrasonic signal to be picked up by the sensor 64.

The O-rings 44 and 54 preferably are fabricated from a material having low friction characteristics. While material such as Teflon or the like is acceptable, other low friction, elastomeric O-rings are available which provide a good sliding seal having very low friction characteristics. For example, anti-friction treated O-rings having excellent characteristics are available from Parker Seal Company of Culver City, California. Other parts of the device such as the housing, piston and stem may be fabricated from other materials including stainless steel, or various plastics. For example, glass reinforced nylon resins such as produced by Du Pont under the trademark "Zytel" is suitable since it is a high strength resin adapted for injection molding techniques. "Minlon" also available from Du Pont may be employed to advantage in the device.

To provide a visual verification of a tire pressure problem, the stem 32 may be color-coded at its outer extremity. Preferably, two color bands may be applied near the end of the stem so that any movement of the stem as a result of a change of tire pressure will be readily observable by direct inspection. For example, if the tire pressure is too high, the lower band will appear whereas if the pressure is too low, the upper band will disappear.

Figure 6:
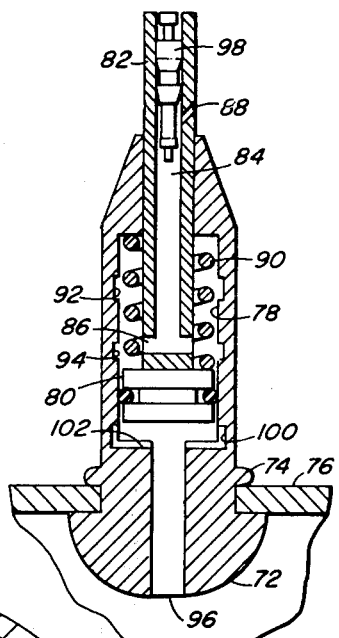
FIG. 6 is a sectional side view of another modification of the invention, and, FIG. 7 is a sectional side view of yet another modification of the invention.

While the device 10 is designed for mounting on an existing standard valve stem 12, obviously it may be easily modified to replace the entire stem and be mounted directly to the wheel as suggested in the embodiment of FIG. 6. In FIG. 6 a generally cylindrical housing 70 is provided with an enlarged base 72 which may be of rubber or the like formed with an annular outer shoulder 74. The base portion of the housing provides a snap-in mounting similar to a conventional tire stem and adapted to engage a wheel rim 76 in the manner shown. The housing 70 is formed with a central cylindrical chamber 78 in which a piston 80 is mounted for reciprocation. The piston carries a tubular stem 82 and is formed with a central passage 84 terminating in its lower end with radial inlet passages 86 and at its upper end in diverging outlet ports 88. A spring 90 is employed to provide a counter-balancing force to the pressure of air in the tire. The inner walls of the chamber 78 are ported at 92 and 94 and function in a manner similar to that of the FIG. 1 embodiment whereby excess motion of the piston through either an increase or decrease in air pressure will result in the escape of a small amount of air from the tire to actuate a sonic or ultrasonic signal at the ports 88. The chamber 78 communicates with the interior of the tire through a passage 96 extending through the base at 72.

In order to permit the tire to be filled with air through the device, a standard filler valve 98 is mounted to the outer end of the stem 82 and air pressure will open the valve 98. Pressure applied to the end of the stem 82 will force the piston to its lowermost position allowing air to pass down through the passage 84 out through the ports 86 and around the piston through grooves 100 formed in the lower end of the cylinder in the chamber 78. The grooves 100 also communicate with radial slots 102 at the base of the chamber communicating with the passage 96. It will be understood that when the stem 82 is in its lowered position, the ports 88 will be closed by the upper portion of the housing 70. Again, the upper end of the stem may be color coded to provide visual verification of tire pressure.

Figure 7:
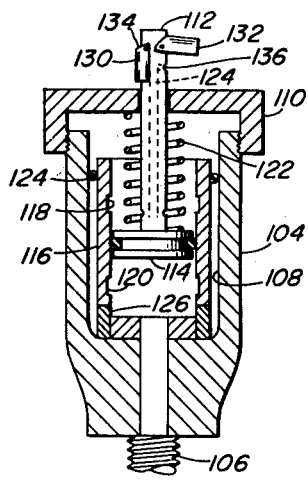

Referring now to FIG. 7 of the drawings there is illustrated a further modification of the invention, and in this embodiment a temperature compensating arrangement is provided to minimize the effects of changes in temperature due either to ambient weather conditions or to heat generated by rotation of the tire. As shown in FIG. 7 a housing 104 may be formed with a tapped socket for threading the same to an existing tire stem 106 or may be formed with an enlarged base as in the FIG. 6 embodiment to replace the standard stem. The housing 104 is formed with an internal cylindrical cavity 108 closed at its upper end by a cap 110 through which extends a stem 112 carried by a piston 114 in a manner similar to the previous embodiments. However, in the present instance a sleeve 116 is mounted coaxially within the cavity 108 and formed with an internal cylindrical chamber having spaced ports 118 and 120 at the upper and lower portions of the sleeve providing escape passages for air from the tire in the event of high or low tire pressure as in the principal embodiment. As before, a spring 122 is provided to counter-balance normal tire pressure. The stem 112 is, of course, formed with an internal passage 124 for generating sonic or ultrasonic signals whenever air is released. The sleeve 116 is fitted within the chamber 108 as by an O-ring 124, and at its lower portion mates with an annular or cup-shaped expansion member 126 which, depending upon the temperature, will cause the sleeve 116 to be axially displaced upward or downward effectively changing the position of the ports 118 and 120 to compensate for temperature changes. The member 126 can be selected from a variety of materials having appropriate coefficient of expansion characteristics selected to expand and contract at a rate different from that of a device as a whole so that a relative movement of the sleeve will be produced. In this fashion, compensation is made for changes in tire pressure due to changes in temperature.

The temperature compensating member can be at the base of the chamber as shown, or may be at the top of the chamber and positioned against the cap 110 with the lower end of the sleeve being free to move up or down. Alternatively, a temperature compensating member may be introduced at either end of the spring 122 in order to provide the correcting compensation. Other variations will appear to those skilled in the art.

In order to protect the discharge ports on the stem from becoming plugged by an accumulation of dust, dirt, ice, snow, etc., protective covers may be provided as suggested in FIG. 7, for example. In the FIG. 7 embodiment, semi-cylindrical covers 130 and 132 are provided on the end of the stem 112, the covers being hinged by pins 134 and adapted to cover discharge orifices 136. Light frictional pressure provided between the hinge pins and the covers will be sufficient to keep the covers in a closed position against the stem, closing the ports 136. However, should air be released by actuation of the device as by high or low tire pressure, the air passing out through the orifices 136 will blow the covers into the open position shown on the right-hand side of FIG. 7 allowing the signal generator to produce the sonic ultrasonic signal. The covers obviously may be provided on the other embodiments.

The pickup sensors 64, which are provided to detect actuation of any or all the valve devices, are located in proximity to each wheel. Preferably a sensor is mounted in each wheel well of the vehicle and one also may be provided in the trunk of the vehicle to monitor the air pressure of the spare tire. All of the sensors are connected to a common signal processor 140 which, in turn, provides an output to a display 143 which conveniently is panel mounted on the dashboard of the vehicle. The sensor 64 may be any one of a variety of devices. However, in practice, it has been found that a miniature piezoceramic resonator provides particularly satisfactory performance. Other suitable devices may include electret based transducers for detecting sonic or ultrasonic signals generated by actuation of the devices.

The processing circuitry 140 provides amplification of signals received from the sensors, compares that signal with a reference signal and then, once detected, actuates a memory circuit which, in turn, will actuate the display. For the sake of simplicity in describing the operation of the circuit, it will be assumed that a single sensor is employed to monitor the various wheels. The output of the sensor 64 is fed through an amplifier 143 prior to being fed into the processing circuitry 140. The processor 140 is powered in the preferred embodiment by the automobile's electrical system through a lead 144. The amplified signal is fed into the processor and through an operational amplifier detector U-1. This is a broad band detector and the bias network for the detector U-1 includes diodes CR1 and CR2, resitors R1 through R5, and capacitor C1. Resistors R15 and R16 form an attenuator where the signals come out of the amplifier. The signal from the operational amplifier detector U-1 is then processed through an RC network comprised of a resistor R6 and capacitor C2 providing integrating functions to build up smoothly each half cycle of the amplified signal and eliminate noise spikes. This integrated signal is compared with a reference voltage across a variable potentiometer 145 which sets the threshold for a comparator U2. It will be understood that the post detection integrator formed by the RC circuit R6 and C2 must exceed the reference from the potentiometer 145 before the comparator U2 will switch. Typically, the comparator U2 will switch from high to low in non-linear fashion and upon which event it will couple with a flip-flop circuit including transistors Q1 and Q2. Once the flip-flop circuit is set, a warning light DS2 will be illuminated and a buzzer B1 will be actuated through the driver circuit which includes a transistor Q3.

It will be noted that the display panel is connected to a switch 147 controlled by the car's ignition switch 149. When the ignition switch is off, the switch 147 will be opened and the display functions will not operate. However, insofar as the flip-flop provides memory functions the warning light, as well as the buzzer, will be actuated when the ignition key is turned on and the switch 147 is closed if a tire pressure event has occurred during the time when the switch 147 was open. This feature thus will give a warning to the driver if a low pressure or high pressure condition occurs while the car is idle.

The display includes an operating light DS1, which preferably is a light-emitting diode similar to the warning light DS2. The warning light DS2 preferably is red while the operating light DS1 is green. The function of the operating light is to inform the operator that the system is functioning properly. A reset switch S1 is provided to reset the circuit after actuation. By utilizing both a buzzer and a warning light, the operator will have both an audio as well as a visual warning when an unusual tire pressure condition occurs.

Additional display elements may be added for more complex installations. For example, separate warning lights may be provided for response to tire-pressure warning device actuation on different sides of the vehicle. In such a system, the valves on the tire on the left-hand side, for example, may be tuned to generate a signal of a different frequency. Such an arrangement not only provides more useful information for the operator, but also minimizes the possibility of a false signal being generated between passing vehicles. Thus, if a car moving in one direction should experience a tire pressure condition and its system generates a signal, it will not actuate the sensing system in a passing vehicle moving in the opposite direction.

The different frequencies from the valve may be obtained by mechanical configuration of the sonic generator. As an alternative measure, the sensors 64 on one side of the vehicle may be tuned to detect only the resonant frequency generated by the tire valve while the sensors on the other side of the vehicle are tuned to pick up only fundamental frequencies from the valve. In such a case, all of the valves on both sides would be matching and generating at least resonant and fundamental frequencies when actuated. This same type of discrimination may be employed on a truck to distinguish between inboard and outboard tires for trucks equipped with tires mounted in pairs.

In the illustrated embodiment of the processor circuitry and display, the display is powered only when the vehicle ignition key is on. The processing circuitry, on the other hand, remains active on a standby basis at all times to acquire and record the sonic warning signal should the pressure condition be reached when the vehicle is at rest and the ignition is in an off position.

Figure 3:
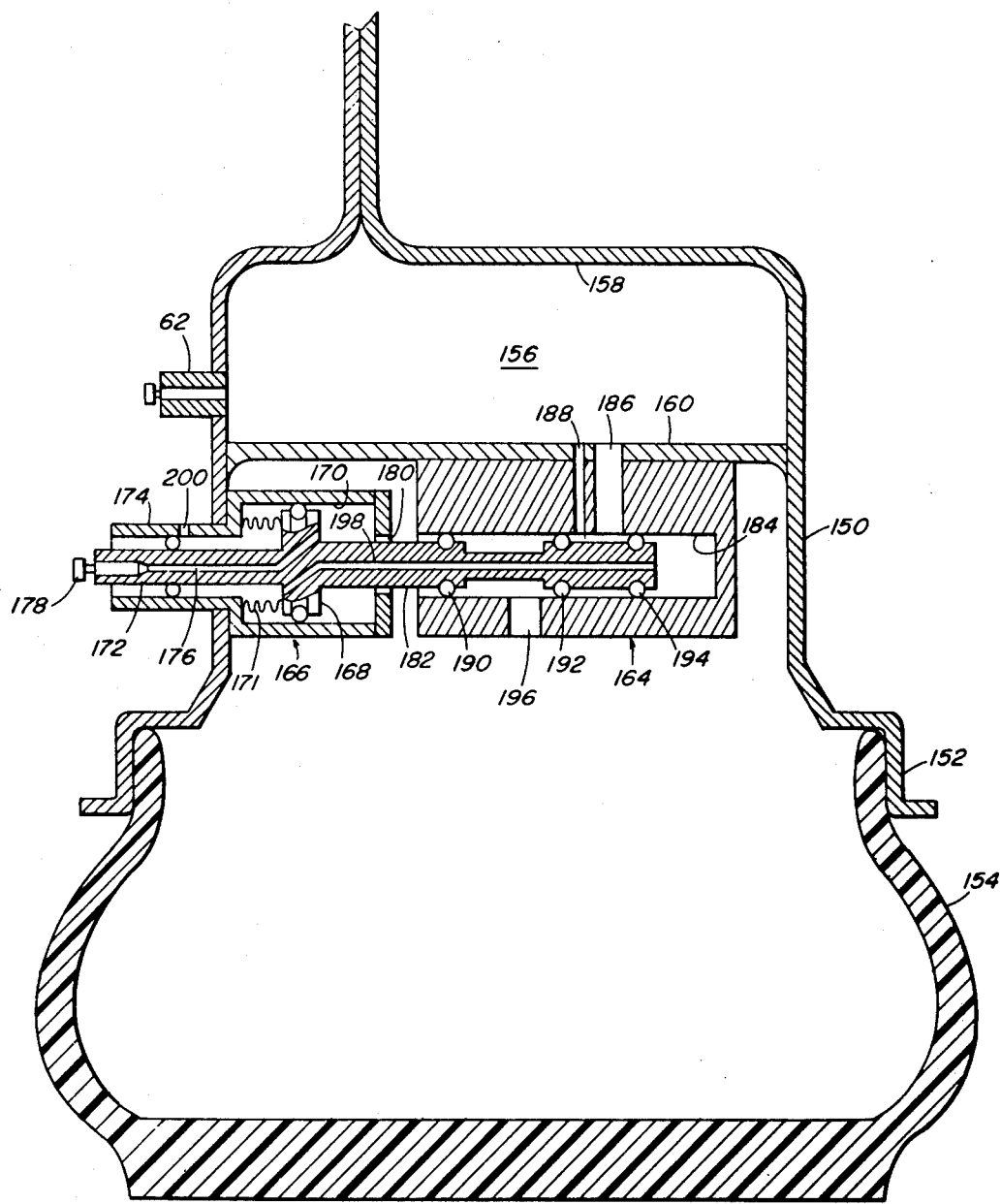
FIG. 3 is a detailed sectional view showing a modification of the invention.
Figure 5:
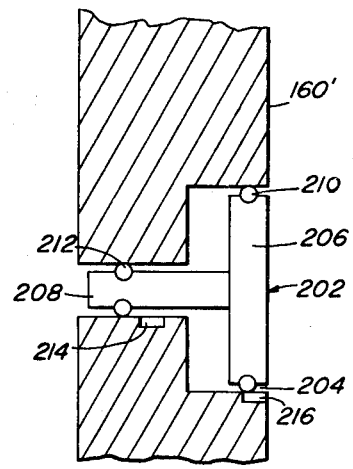
FIG. 5 is a detailed sectional view of a portion of the valving in the modification.
Figure 4:
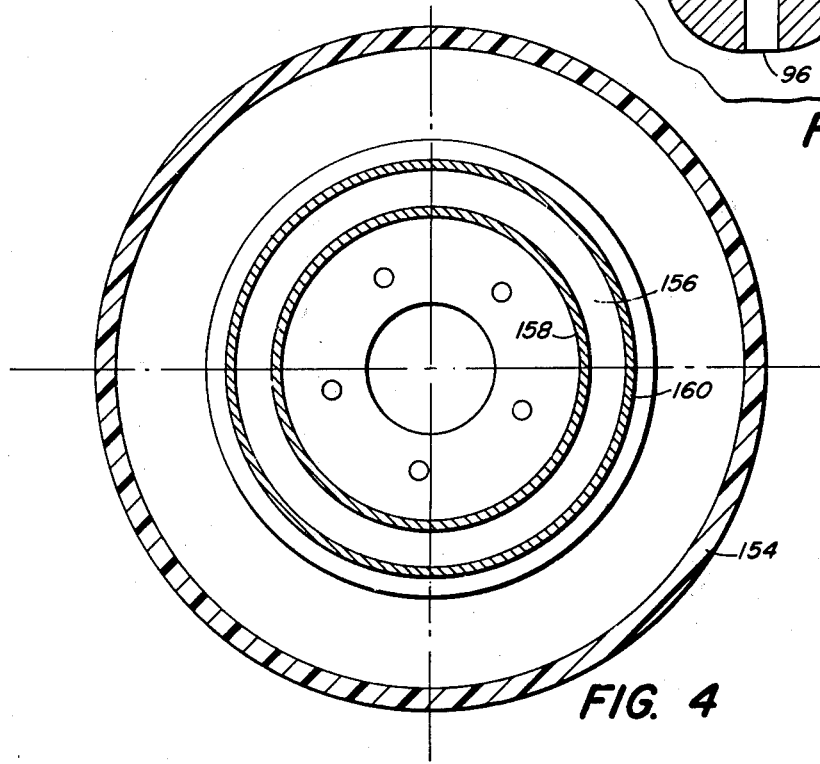
FIG. 4 is a sectional view in side elevation of the modification.

Referring now to FIGS. 3, 4 and 5 of the drawings, there is illustrated a modification of the invention and, in this embodiment, an automatic air replenishment system is provided in combination with a pressure signal generating device whereby air lost from a tire, whether by a slow leak or a blowout, will be automatically replaced even when the car is in motion. Simultaneously, a signal will be generated to warn the driver of the condition. The system includes a wheel 150 formed with the usual rim 152 in which a pneumatic tire 154 is mounted. The wheel 150 normally fabricated from steel in the usual manner, however, the wheel also includes a chamber 156 which preferably extends concentrically about the inner portion of the wheel and is of annular shape as best shown in FIG. 4. The chamber 156 is formed by inner and outer walls 158 and 160 extending in spaced concentric relation and sealed to the wheel to form an airtight pressure chamber adapted to store compressed air of perhaps 400 psi for extended periods of time. The compressed air is introduced to the chamber 156 by a standard filling valve 162 mounted through the side wall of the wheel.

Air delivery from the chamber 156 to the tire 154 is controlled by means of a release valve 164 which, in turn, is controlled by means of a pressure-sensing and signal generating valve 166 mounted to the wheel. The valve 166 includes a piston 168 mounted for reciprocation within a cylinder 170 and normally urged to the right as viewed in FIG. 3 by means of a compressed spring 171. The piston carries a stem 172 projecting out through the wheel within a concentric fixed sleeve 174. The stem 172 includes a central passage 176 and at its outer end carries a standard filling valve 178 whereby the tire may be filled initially to normal pressure. Air is fed through the valve 178, through the passage 176 and into the cylinder 170 at the right hand side of the piston 168. The air then passes through an opening 180 into the tire. The piston moves back and forth within the cylinder 170 according to changes in tire pressure.

Extending from the right side of the piston 168 is a rod 182 projecting into the release valve 164 and mounted for reciprocating movement within a cylindrical chamber 184. The chamber 184 communicates with the pressure chamber 156 through a pair of passages 186 and 188, one being larger than the other. The smaller passage 188 serves to replenish air to the tire during a slow leak condition whereas in the event of a blowout, both passages 186 and 188 are employed to feed air to the tire. The rod 182 carries three axially spaced O-rings 190, 192 and 194. Under normal pressure conditions the piston 168 and rod 182 will be in a position as shown in FIG. 3. However, in the event of a slow leak, tire pressure will drop and the piston and rod will move to the right as viewed in FIG. 3, opening the passage 188 and allowing air to flow from the chamber 156 through the passage 188, thence through the chamber 184 and out through a port 196 and into the tire 154. At the same time, air will pass through a passage 198 formed in the rod 182 and out through the left hand side of the piston 168, flowing between the stem 172 and the sleeve 174 out through an orifice 200 which will generate a sonic or ultrasonic signal to be picked up by the sensors to warn the driver of the low pressure condition. In the event of a sudden drop in pressure, as occasioned by a blowout, the rod 182 will move to a maximum right hand position, opening both ports 186 and 188 threrby allowing a much greater flow of air from the chamber 156 to the tire to compensate for the loss of pressure in the tire. Again, a signal will be produced by air flowing through the passage 198 to actuate a sonic or ultrasonic signal generator. The system is designed to supply air pressure to the tire in proportion to the rate of loss and sustain a predetermined pressure such as 23 psi.

Referring now to the FIG. 5 of the drawings, there is illustrated a further modification of the invention and in this embodiment a simple piston valve 202 is mounted in a wall 160' corresponding to the wall 160 of the FIGS. 3 and 4 embodiment wherein an auxiliary supply of compressed air is maintained in a pressure chamber formed within a wheel. However, in place of the valve device 164 utilized in the FIG. 3 arrangement, the simple valve 202 is employed in the FIG. 5 embodiment. In FIG. 5, the wall 160' is formed with a stepped opening 204 in which the piston valve 202 is mounted. The opening 204 on the tire pressure side, which is the right hand side of FIG. 5, is substantially larger in diameter than the opening on the auxiliary tank or the left hand side of the wall as shown in FIG. 5. Similarly, the piston 202 is formed with a relatively large diameter head 206 on the right hand side and a relatively narrow diameter stem 208 on the high pressure auxiliary tank side. Both the head 206 and the stem 208 are provided with O-rings 210 and 212, respectively, to provide a seal between the valve and the opening. The walls of the opening 204 are provided with ports 214 and 216 through which compressed air may flow from left to right when the piston 202 moves to the right whenever the forces on opposite sides of the piston become unbalanced.

It will be understood that the large diameter of the head and the small diameter of the stem results in the forces on the piston being effectively balanced even though pressure on the left hand side of the wall 160' is substantially higher than the pressure on the tire side. However, if there is a drop in pressure on the tire side, the forces on the floating piston will become unbalanced causing the piston to move to the right as viewed in FIG. 5. This motion of the piston will open the ports 214 and 215 allowing high pressure compressed air to flow into the tire until the forces are again equalized. In the event of a blowout, all of the air in the auxiliary tank will be quickly transferred into the tire. When using the valve device in FIG. 5, a tire pressure warning device of the sort shown in FIG. 1, for example, may be employed in order to keep the driver advised of the condition.

Obviously, various means may be provided to prevent the valve from coming completely out of the opening 204. For example, a screen or annular shoulder can be provided on the tire side of the wall 160' to limit the movement of the valve.

Having thus described the invention, what I claim and desire to obtain by Letters Patent of the United States is:

1. An automatic air replenishment and low pressure warning system for a pneumatic tire, comprising
 a. a wheel adapted to support a tire mounted thereto,
 b. said wheel being formed with spaced tire supporting front and rear walls joined at their inner portions and an annular wall between said front and rear walls defining an integral annular concentric chamber adapted to store a quantity of compressed air at a pressure higher than the normal pressure in said tire,
 c. normally closed pressure responsive valve means connecting said chamber to the interior of said tire and adapted to open when the pressure in said tire drops to a predetermined level whereby replenishing pressurized air is delivered into said tire, d. said valve means including a release valve fixed to said annular wall and formed with a cylindrical chamber therein, a spring loaded rod movably mounted in said chamber and adapted to open and close said chamber according to the pressure in said tire, e. said valve means formed with a passageway and including an acoustical signal generating device operatively connected to said rod through said passageway and adapted to produce an acoustical warning signal in the event of a low pressure condition in said tire, and, f. acoustic sensing means disposed remotely from said tire and responsive to an acoustic signal generated thereby, said sensing means including warning means actuated by said sensing means upon sensing of an acoustic signal.

* * * * *